Figure 1:
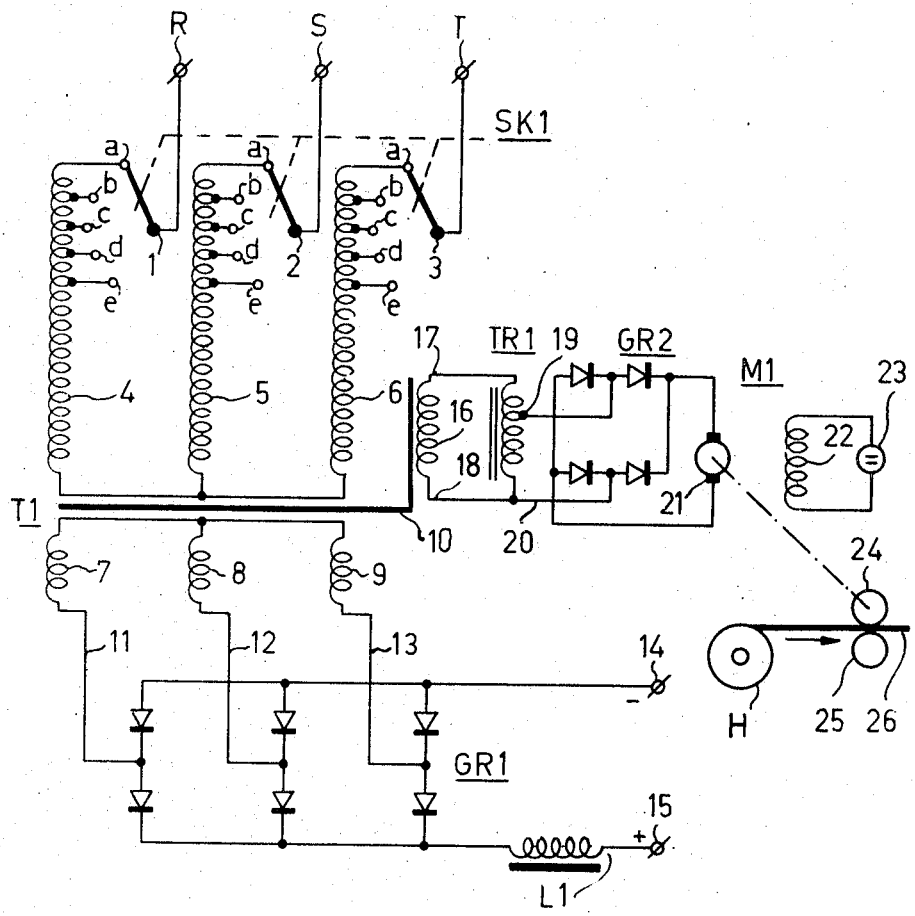

United States Patent [19]

Blavier

[11] 3,849,627
[45] Nov. 19, 1974

[54] ARC WELDING DEVICE WITH CONSUMABLE WELDING WIRE

[75] Inventor: Arthur Victor Joseph Blavier, Bierges Lez Wavre, Belgium

[73] Assignee: U.S. Philips Corporation, New York, N.Y.

[22] Filed: Apr. 20, 1973

[21] Appl. No.: 352,875

[30] Foreign Application Priority Data
May 24, 1972 Netherlands.................. 7206946

[52] U.S. Cl.................................. 219/131 F, 13/13
[51] Int. Cl............................................ B23k 9/10
[58] Field of Search............ 219/131 F, 135; 13/13; 307/17; 323/48, 57

[56] References Cited
UNITED STATES PATENTS

| 2,933,592 | 4/1960 | Bichsel | 219/131 F |
| 3,048,693 | 8/1962 | Adamson et al. | 219/131 F |
| 3,597,518 | 8/1971 | Roberts | 13/13 |

Primary Examiner—E. A. Goldberg
Assistant Examiner—Hugh D. Jaeger
Attorney, Agent, or Firm—Frank R. Trifari; Bernard Franzblau

[57] ABSTRACT

Very simple control of the melting rate of welding wire is achieved by supplying the motor driving the drive rollers for the consumable welding wire with a voltage drived from an extra secondary winding coupled to the first secondary windings of a multiphase welding transformer, which via rectifiers supply the welding direct current. This extra winding ensures the better coupling to the secondary welding windings by employing the stray flux. By combinations of taps on the windings via a multiple switch, welding characteristics can be obtained and each characteristic has a stable point to which the control system adjusts itself.

11 Claims, 3 Drawing Figures

ARC WELDING DEVICE WITH CONSUMABLE WELDING WIRE

The invention relates to an arc welding device operating with consumable welding wire and direct current, comprising a multiphase welding transformer first having a group of secondary windings which are connected to a rectifier bridge and supply the welding current, further comprising a wire feed device equipped with a motor coupled to drive rollers and a reel with consumable welding wire.

Arc welding devices are known in which use is made of direct current and in which a consumable welding wire serving as an electrode is fed from a reel via drive rollers by means of a wire feed device. A problem associated with these devices is to obtain the correct melting rate of the welding wire. On the one hand, this melting rate is determined by the developed energy, parameters of which are inter alia the arc welding voltage, the arc welding current and the desired welding process. On the other hand, the wire feed rate and the tolerances thereof are also of great significance. Solutions to this problem have been found by relating the arc voltage or arc current to the wire feed rate.

U.S. Pat. No. 2,636,102 describes a d.c. welding device which employs a d.c. welding generator and which measures the arc voltage between workpiece and electrode. The arc voltage is compared to an adjustable reference and the difference controls a valve amplifier which energizes the motor for the drive rollers. The wire feed rate will adapt itself so as to minimize the difference between the arc voltage and the reference.

A drawback of said measuring method is that, depending on the welding process, the arc voltage may vary considerably and that filters are required to obtain a stable average value.

U.S. Pat. No. 2,132,479 describes an a.c. welding device with a welding transformer whose secondary winding is connected to the consumable wire and the workpiece via a current measuring transformer. By means of rectifiers, the secondary alternating voltage of the transformer, the arc voltage and the arc current are converted via the measuring transformer into direct currents which supply a d.c. motor coupled to the drive rollers. Consequently, the wire feed rate is a function of said parameters.

It is known to replace the d.c. welding generator described in the first-mentioned United States Patent by a multi-phase rectifier system.

Figure 3:
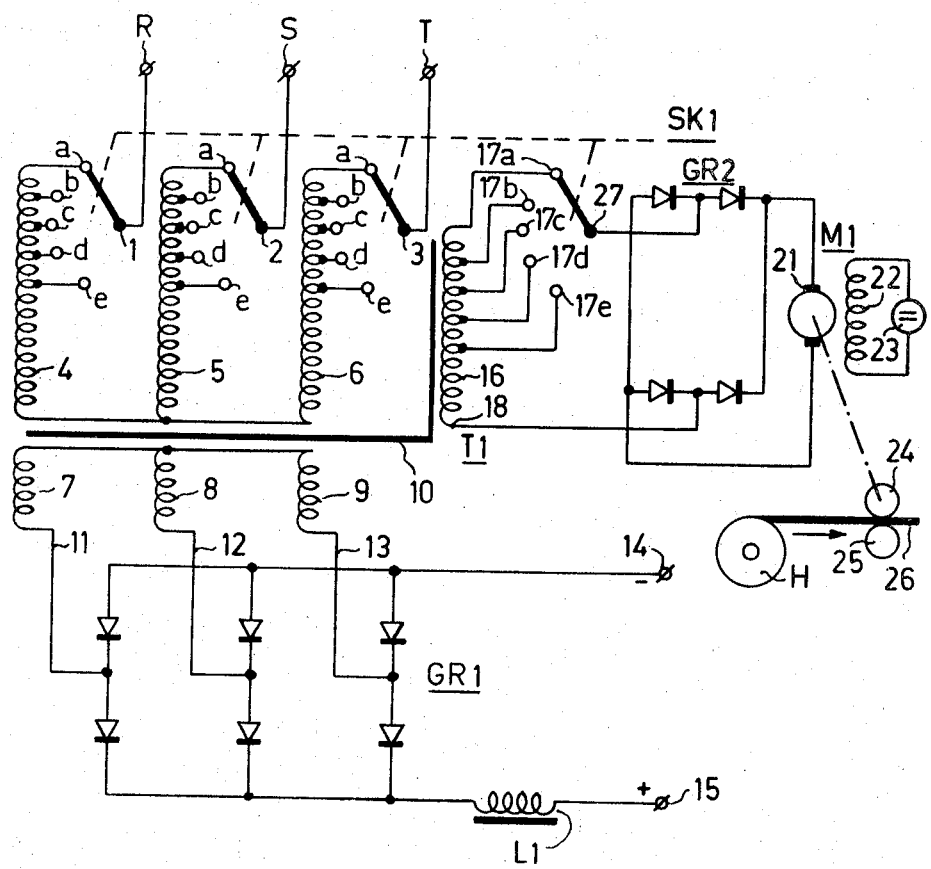

In FIG. 3 of U.S. Pat No. 3,423,564 a three-phase supply voltage is connected to a welding transformer comprising three primary windings connected in delta arrangement, the supply lines, being connected to corresponding taps on the primary windings. The secondary windings, which are also connected in delta, are also provided with tappings and are connected to a full-wave rectifier bridge having six diodes. The welding current, available at the two output terminals, is a direct current with a small ripple. The wire feed rate is maintained constant and is not related to the electrical parameters of the welding process.

An object of the invention is to provide a welding device of the type described above comprising a multi-phase welding transformer and rectifier bridge, appropriate control of the motor speed being achieved in a simple manner without the use of complicated measuring devices with filters and amplifier elements, so that a correct wire feed rate is adjusted as a function of the electrical welding parameters, such as welding voltage and welding current.

To this end, an arc welding device of the type mentioned in the preamble, using consumable welding wire and direct current, is characterized in that the multiphase welding transformer comprises a second auxiliary secondary winding which is connected to the motor and whose voltage determines the motor speed.

The advantage of said welding device is that information is derived both from the welding voltage and from the welding current by utilizing the properties of the multi-phase transformer. Owing to the non-ideal coupling of primary and secondary windings, and the non-ideal coupling of the secondary windings mutually, via the magnetic circuit of the transformer, better information on said parameters can be obtained by means of a separate winding in said magnetic circuit. To this end, it does not suffice to use one of the secondary welding windings, as proposed in the device according to U.S. Pat. No. 2,132,479. Each of the three windings supplies current to the welding arc for a very short time and only then might the information be adequate, but for the remaining, much longer time, this winding supplies no current and sufficient information cannot be obtained owing to the poor coupling with other windings.

Additional advantages of a device according to the invention are that an additional transformer coupled to the supply source can be omitted as compared with known motor control systems, that the control system according to the invention is very simple because, for example, only one full-wave rectifier is required between the second secondary winding and the armature winding of a d.c. drive motor and that the welding conditions can be set with a single switch. For slight adaptations or adjustments an embodiment according to the invention may include a variable transformer between the second secondary winding and the motor for fine control of the motor speed.

In embodiments of the invention a welding condition can be set by adjusting the voltage and, if required, the current on the primary side, for example, by means of a multiple switch having mechanically coupled sections, each of which connects a phase of the supply voltage to a tap on a primary transformer winding, or by providing the second secondary winding with taps and connecting said taps to an additional switching section of the multiple switch, so that a correct setting in accordance with certain welding processes can be attained either in combination with a primary voltage adjustment or in combination with a secondary voltage adjustment with the advantage of the invention: an automatic control of electrical welding parameters and wire feed rate.

Figure 2:
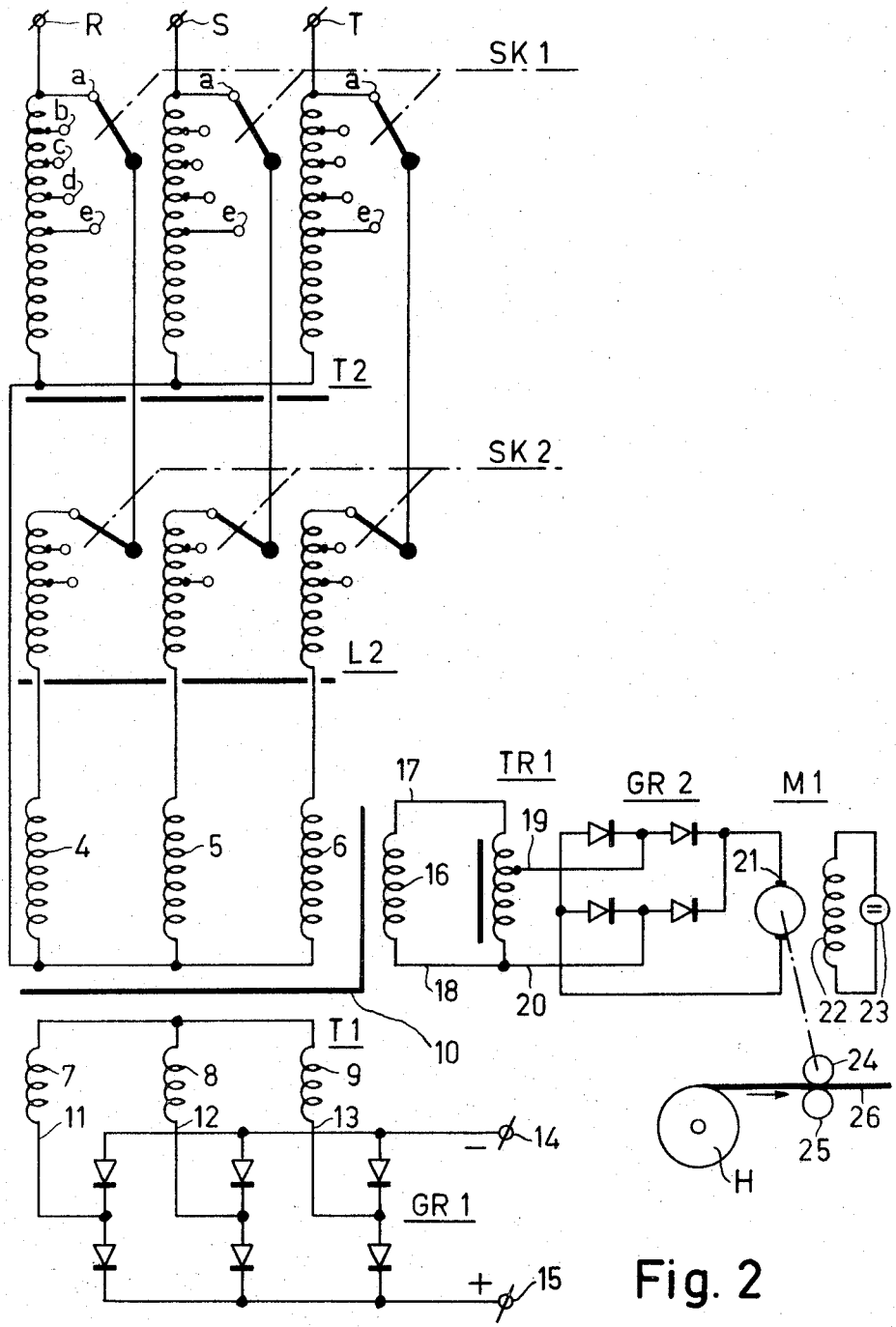

The invention now will be described in more detail, by way of example, with reference to the accompanying drawings in which:

FIG. 1 shows an arc welding device according to the invention with primary voltage adjustment, FIG. 2 shows a device according to the invention with primary voltage adjustment and primary chokes, and FIG. 3 shows a device according to the invention with an additional switching section for motor voltage adjustment.

In FIG. 1 the terminals R, S and T are connected to a three-phase supply source. By means of a multiple switch SK1 comprising three switching sections 1, 2 and 3, the supply source is connected to the primary windings 4, and 5 and 6 of a welding transformer $T_1$. The switching sections 1, 2 and 3 are mechanically coupled, section 1 permitting the phase on the terminal R to be connected to the tapes $a, b, c, d$ and $e$ on the winding 4. The windings 5 and 6 are provided with corresponding taps $a$ to $e$, which in accordance with the setting of the switching section 1 are interconnected to the phase on the terminal S via the switching section 2 and the phase on the terminal T via the, switching section 3 respectively. The transformer $T_1$ is, furthermore, provided with first secondary windings 7, 8 and 9 which, like the primaries, are connected in star arrangement. The magnetic yoke of transformer $T_1$ has the reference numeral 10. The output terminals 11, 12 and 13 of the windings 7, 8 and 9 are connected to a recitifier bridge GR1, which comprises 6 diodes. The current thus six-phase rectified may be applied to the terminals 14 and 15 to which a welding torch and a workpiece are to be connected. The line from GR1 to terminal 15 includes a choke $L_1$. Coupled to the magnetic flux in yoke 10 is a second or auxiliary secondary welding 16, whose connection terminals 17 and 18 are connected to a variable transformer TR1. At an output terminal 20 and a wiper 19 a voltage is available which is full-wave rectified by means of a rectifier bridge GR2 and applied to the armature winding 21 of a motor $M_1$ whose field winding 22 is energized by voltage a source 23. The motor $M_1$ drives the drive rollers 24 and 25 so that the consumable welding wire 26 can be fed from a reel H to the welding torch, not shown, with a given speed.

Assuming that the installation is in operation and a welding arc has been struck, an excessive feed rate of the welding wire will cause a higher welding current. As a result of various impedances in the welding circuit, inter alia due to the leakage flux, the welding voltage decreases. Consequently the voltage across the winding 16 will also decrease so that the motor slows down and the wire feed rate decreases. Thus, it proves to be possible to maintain a stable point on the welding characteristic at which the wire feed rate has the correct value to ensure a constant melting rate in accordance with the developed welding energy and the desired process. By moving the wiper 19 of the variable transformer TR1 other stable points on the welding-voltage versus welding-current characteristic can be obtained.

FIG. 2 shows an arc welding device in which a welding transformer $T_1$ has no taps and the secondary choke $L_1$ in FIG. 1 is replaced by a primary choke $L_2$ with taps which can be selected by a switch SK2. The voltage adjustment for the welding device is obtained by means of a tapped transformer $I_2$ connected in star arrangement to the terminals R, S and T. Per phase the multiple switch SK1 connects one of the taps $a$ to $e$ to one of the three chokes $L_2$, which in turn are connected to the three phases in star arrangement of the welding transformer $T_1$. The star points of $T_1$ and $T_2$ are interconnected.

The welding characteristic of the device drops steeply due to the presence of the primary choke, which means that the welding voltage decreases substantially at greater welding currents. As a result, a very precise control of the welding conditions with respect to the wire feed rate is attained due to the steeper slope.

The device of FIG. 3 is identical to that of FIG. 1, only the variable transformer TR1 is not included. However, the second secondary winding 16 is provided with taps $17a$, $17b$, $17c$, $17d$ and $17e$ which by means of a switching section 27 mechanically coupled to the other switching sections 1, 2 and 3 and SK1, can be connected to the rectifier bridge GR2. This selection facility enables special welding characteristics to be obtained. It is, for example, possible to maintain the wire feed rate constant if the taps $a$ to $e$ on the primary windings 4, 5 and 6 have the same ratio as the tappings $17a$ to $17e$, so that the voltage on the motor winding remains constant. Thus, simple adaptation to different wire diameters of the consumable welding wire is possible. Through this provision the welding device may also assume the character of a current source because at higher welding voltages the wire feed rate is adjusted so that the control point will be situated at approximately the same welding current. Specific desired welding characteristics can also be obtained by coupling the switching section 27 to the sections 1, 2 and 3 of SK1 by means of which the taps on the secondary windings 7, 8 and 9 are switched.

What is claimed is:

1. An arc welding device for welding work with a consumable welding wire and a direct current, comprising a multi-phase welding transformer having primary windings adapted to be connected to respective phase lines of a multiphase power supply and a first group of secondary windings connected to a rectifier bridge to supple the welding current, a wire feed device including a motor coupled to drive rollers and with a reel containing consumable welding wire, the multi-phase welding transformer further comprising an auxiliary secondary winding connected to the motor and whose voltage determines the motor speed.

2. An arc welding device as claimed in claim 1 further comprising a variable transformer included between the auxiliary secondary winding and the motor to control the motor speed.

3. An arc welding device as claimed in claim 1 further comprising a multiple switch for selecting the arc welding voltage and provided with a switching section for each phase line of the multiphase power supply, means connecting the switching sections of the multiple switch to corresponding taps on the primary windings of the multi-phase welding transformer and to the power supply phase lines for interconnecting the multiphase supply lines with the corresponding primary winding taps for setting the welding conditions with respect to arc welding voltage and wire feed.

4. An arc welding device as claimed in claim 1 further comprising a multiple switch for selecting the arc welding voltage and provided with a switching section for each phase line of the multiphase power supply and a further switching section for the auxiliary secondary winding, the auxiliary secondary winding being provided with taps electrically connected to the further switching section whereby the taps are selectively connected to the motor for setting the welding conditions with respect to welding voltage and wire feed.

5. An arc welding device as claimed in claim 4, characterized in that the switching sections of the multiple switch are connected to corresponding taps on the primary windings of the multi-phase welding transformer for selectively interconnecting the multi-phase supply lines with corresponding primary winding taps.

6. An arc welding device as claimed in claim 4, characterized in that the switching sections of the multiple switch are connected to corresponding taps on the first group of secondary windings of the multi-phase welding transformer for the connection to the rectifier bridge.

7. An arc welding device as claimed in claim 2 further comprising a multiple switch provided with a switching section for each phase line of the multiphase power supply, means connecting the switching sections of the multiple switch to corresponding taps on the primary windings of the multiphase welding transformer and to respective phase lines of the power supply for selectively connecting said phase lines to said corresponding primary winding taps for adjusting the arc welding voltage.

8. An arc welding device for welding work with a consumable electrode comprising, means including a motor for driving the electrode, a plurality of input terminals adapted to be connected to a multiphase source of AC voltage, a multiphase welding transformer having a plurality of primary windings connected to respective input terminals and a first group of secondary windings connected to a rectifier bridge for the supply of a DC welding current, said transformer further comprising an auxiliary secondary winding connected to the motor so as to control the motor speed.

9. An arc welding device as claimed in claim 8 wherein said primary windings include a plurality of taps, said device further comprising a multiple switch having a plurality of switching sections for selectively connecting the taps on the primary windings to respective input terminals for simultaneously adjusting the voltages of the transformer primary windings.

10. An arc welding device as claimed in claim 9 further comprising a variable transformer coupled between the auxiliary secondary winding and the motor for adjusting the motor speed.

11. An arc welding device as claimed in claim 9 wherein said auxiliary secondary winding included plurality of taps corresponding to the primary winding taps and said multiple switch includes a further switching section operable in synchronism with said plurality of switching sections for selectively connecting the auxiliary winding taps to the motor input for adjusting the motor speed.

* * * * *